United States Patent [19]

Engelhardt et al.

[11] 4,048,077
[45] Sept. 13, 1977

[54] AQUEOUS CLAY BASE MUD FOR DEEP DRILLING

[75] Inventors: Friedrich Engelhardt, Frankfurt am Main; Martin Hille, Bad Soden, Taunus; Dieter Ulmschneider, Konigstein, Taunus, all of Germany

[73] Assignee: Hoechst Aktiengesellschaft, Frankfurt am Main, Germany

[21] Appl. No.: 611,616

[22] Filed: Sept. 9, 1975

[30] Foreign Application Priority Data

Sept. 14, 1974 Germany .............................. 2444108

[51] Int. Cl.$^2$ ................................................ C09K 7/02
[52] U.S. Cl. ......................... 252/8.5 C; 260/79.3 M
[58] Field of Search ...................... 252/8.5 C; 175/65; 260/79.3 M

[56] References Cited

U.S. PATENT DOCUMENTS

| | | | |
|---|---|---|---|
| 2,718,497 | 9/1955 | Oldham et al. ........................ | 252/8.5 |
| 3,025,234 | 3/1962 | Canterino ........................... | 252/8.5 |
| 3,629,101 | 12/1971 | Hille et al. .......................... | 252/8.5 |

*Primary Examiner*—Herbert B. Guynn
*Attorney, Agent, or Firm*—Connolly and Hutz

[57] ABSTRACT

An aqueous clay base mud for deep drilling containing as a protective colloid a copolymer which is constituted by the formula I, II and III

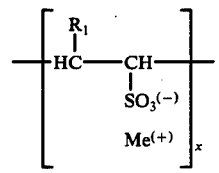

I,

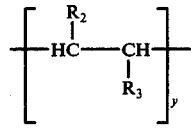

II,

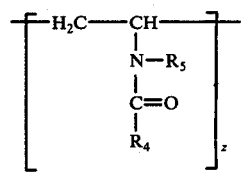

III in which $R_1$ and $R_2$ each is hydrogen of —$CH_3$; $R_3$ is —CO—$NH_2$, —CN or $COOCH_3$; $R_4$ is hydrogen, —$CH_3$ or —$C_2H_5$; $R_5$ is —$CH_3$ or —$C_2H_5$ or $R_4$ and $R_5$ together represent a propylene group forming a pyrrolidone radical with the inclusion of the radical

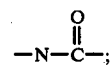

Me is ammonium, potassium, sodium or lithium and $x$ is 5 to 50, $y$ 25 to 92 and $z$ 3 to 70, or by the saponification products thereof and which contains the components in the parts by weight of the starting monomers indicated by the indices $x$, $y$ and $z$.

4 Claims, No Drawings

AQUEOUS CLAY BASE MUD FOR DEEP DRILLING

This invention relates to an aqueous clay base mud for deep drilling.

Very different requirements are to be met by drilling muds for oil or gas deep drillings. These requirements may even still vary according to the drill hole conditions. The drilling mud is to wash out the drilled material in satisfactory manner and to separate it above ground, to compensate the reservoir pressure, to form a filter cake in the porous rock, to cool, lubricate and preserve the drilling tools sufficiently, not to damage the reservoir and to allow drill hole measurement for geological purposes, to favor the drilling process and to have with the rock a reciprocity as little as possible.

In the simplest case, drilling muds that meet these requirements are generally aqueous clay suspensions. In practice, a great many of flat bore holes or the upper zones of deeper holes are sank with muds of this type. Due to increasing temperatures, the properties matched before of the sludges are getting more instable the more they penetrate into the depth. In the case of formations with water-soluble salts, the clay flocculates and the mud properties are disadvantageously modified. In order to stabilize and optimize these properties, various additives are added to the muds. To control the flow properties and the water release to the rock, thinners, such as quebracho and, more recently, mainly lignites and lignosulfates, are frequently used in drilling muds.

In the case of drilling muds, the mud properties are stabilized partially with the aid of starch but mainly with the aid of cellulose ethers, such as carboxymethyl cellulose. Polymers on the basis of acrylic acid or acrylic acid and acrylic amide or on the basis of maleic acid anhydride are also used to a limited extent. These polymers on the basis of polycarboxylic acids have the drawback to be very sensible towards the ions forming the hardness of the water which ions can practically not be excluded in drilling muds. These polymers are constant up to temperature values of about 250° C, while cellulose ethers lower their efficiency already at about 160° to 180° C and starch derivatives at about 100° to 120° C.

Copolymers on the basis of vinyl sulfonic acid and vinyl carboxylic acid amides that are also used as auxiliaries for the preparation of drilling muds, are stable at temperatures up to about 250° C and, moreover, unsensible towards the ions present in drilling muds. In contradistinction to other known drilling mud additives a further advantage of these compounds is a good hydration of the bentonite under drill hole conditions in muds on the basis of salt water or sea water prepared therewith. Under these circumstances, aqueous salt base muds are formulated which have a good bearing capacity for the drilled out material with low concentrations of bentonite and low viscosity. Thus, the drilling process is improved.

Products of the type of vinylsulfonic acid/vinylcarboxylic acid amides can only be polymerized to molecules of sufficient dimensions when relatively high amounts, generally above 40%, of vinyl carboxylic acid amides are employed as monomer component. Only products having such a high molecular weight are sufficiently effective protective colloids at temperatures above 150° C. Higher amounts of the cationic vinyl carboxylic amides additionally augment the effect increasing the thixotropicity of these compounds.

These products having high amounts of vinyl carboxylic amides are therefore preferably suitable for drilling muds rich in electrolytes. However, in muds poor in electrolytes, these compounds very much stimulate, especially in higher concentrations, the hydration of smooth clays drilled out, with the drawback that the viscosity heavily increases already after a short drilling period.

Now, it was found that these drawbacks do not appear with aqueous clay base muds for deep drillings when as additives for the preparation of drilling muds water-soluble copolymers or their saponification products are used which are constituted by the components of the formulae I, II and III and which contain these components in any desired order in the amounts indicated by the indices $x$, $y$ and $z$.

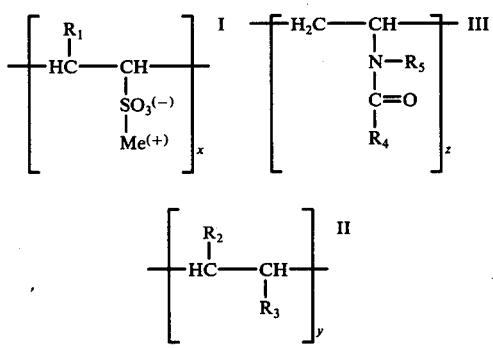

The symbols in the general formulae are defined as follows:

$R_1$ and $R_2$ each is hydrogen or —$CH_3$, preferably hydrogen;

$R_3$ is —$CONH_2$, —$CN$ or —$CO$—$OCH_3$, preferably —$CONH_2$;

$R_4$ is hydrogen, —$CH_3$ or $C_2H_5$;

$R_5$ is —$CH_3$ or —$C_2H_5$ or $R_4$ and $R_5$ together are a propylene group which forms a pyrrolidone group with the inclusion of the radical

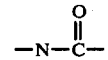

of the formula III;

Me is ammonium or the alkali metals potassium, sodium or lithium.

The indices $x$, $y$ and $z$ indicate the percentages by weight of the starting monomers to be employed for the preparation of the copolymers;

$x$ is 5 to 50%, preferably 10 to 30;

$y$ is 25 to 92%, preferably 40 to 80;

$z$ is 3 to 70%, preferably 10 to 35.

The polymers are frequently used with special advantage in the form of their saponification products. In this case, an alkaline saponification, preferably in part, of the polymers, especially of their amide, nitrile and ester groups is carried out before their use. When copolymers are used which are not saponified, the moiety of vinylsulfonic acid monomers (component I) should at least be 25% by weight.

The copolymers of the invention are prepared in known manner by reacting the monomers at temperatures ranging between about −10° and 80° C, preferably 20° and 60° C in the presence of suitable polymerization catalysts. The polymerization is advantageously effected in aqueous phase, optionally, however, also in aqueous solutions of organic solvents miscible with water, for example methanol, ethanol, tert.-butyl alcohol, tetrahydrofurane or dimethyl formamide. Suitable polymerization catalysts are above all percompounds, such as, benzoyl peroxide, acetyl peroxide, tert. butylhydroperoxide or alkali metal and ammonium peroxide sulfate or also Redox systems, such as N-p-tolylsulfonylmethyl carbamic-acid methyl ester/ammonium peroxide sulfate. Optionally, cocatalysts, such as dibutylamine-hydrochloride or traces of copper salts may also be added. The addition of polymerization initiators, such as, for example diazoisobutyronitrile, may be advantageous.

As index for the molecular weight of the copolymers of the invention their K-values may, for example be taken (cf. H. Fikentscher, "Cellulosechemie" 13 (1932), page 58). The K-value of the copolymers to be used according to the invention should, if possible, be over 60 and not more than about 200, preferably, they should be within the range of from 110 to 170.

According to the general formulae I, II and III, suitable monomers for the preparation of the copolymers to be used in this invention, the following compound can be used:

I the vinyl or allyl sulfonic acid or the alkali metal salts or ammonium salts thereof;

II the acrylic acid amide, acrylic acid nitrile or acrylic acid methyl ester or the corresponding methacryl compounds;

III N-vinyl-N-alkyl-carbonamides of the formula

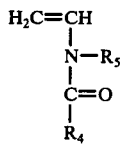

IIIa in which $R_4$ and $R_5$ are defined as in formula III, especially N-vinyl-N-methyl-acetamide or N-vinyl-pyrrolidone.

The copolymers are obtained in the form of viscous, preferably aqueous solutions and can be used in this form in the process of the invention. To prepare saponification products of the copolymers, alkali metal hydroxide is added to the polymer solutions in the amounts required and the temperature is raised advantageously to about 85° to 120° C, until the desired saponification degree is reached. Should it be intended to prepare the polymers in solid form, the polymer solutions can be subjected to a usual vaporization or drying process, advantageously to a spray drying or roller drying process.

Depending on their concentration in the copolymer, the individual monomer components of the copolymers to be used in this invention help to control the properties of the aqueous base drilling muds. It was found that the anionic groups in the copolymers have a lowering effect on the thixotropicity of the drilling muds while cationic groups increase the thixotropicity of these muds. Sulfo, amide, nitrile and ester groups contained in the copolymers increase the stability of the polymers towards calcium ions. Under the conditions of the drilling muds in deep bore holes, at elevated temperatures and mostly low alkalinity, the amide, nitrile and ester groups are saponified to carboxyl groups. The formation of carboxyl groups in the copolymer increases its sensibility towards calcium ions. At the same time, the flow properties of the drilling mud change to become less visquous and gelatinous, that is the drilling mud loses in discharge capability. Therefore, it often proved to be advantageous to saponify the copolymers before their use according to the invention. It was also found that the additional use of monomers of the type III does not or only slightly affect the thixotropic properties, i.e. the viscous and gelatinous state. This can be explained by the fact that upon saponification no anionic groups are formed in the copolymer from the monomers of type III.

For the preparation of the aqueous drilling muds, the copolymers of the invention are advantageously used in concentrations of about 0.5 to 40 kg/m³, preferably 2 to 20 kg/m³. The content of clays increasing the viscosity in the drilling muds, for example bentonite, is within the usual ranges depending on the conditions in the bore hole.

The following Examples illustrate the invention.

EXAMPLE 1

Preparation of the copolymers

In a 2-liter reaction flask provided with stirrer and gas inlet tube 130 g of acryl amide were dissolved in 710 ml of water while stirring whereafter 129 g of a 31% aqueous solution of vinylsulfonic acid sodium and 30 g of N-vinyl-pyrrolidone were added. A small nitrogen stream allowed to pass through expelled the air from the reaction vessel and after 30 minutes 2 g of diazoisobutyronitrile were added as catalyst. The temperature of the reaction mixture was raised to 50° C by means of a water bath. After an induction phase of 43 minutes, polymerization started with the increase of temperature and viscosity. After 20 minutes, a maximum temperature of 84° C was reached, stirring was stopped and heating was continued for 2 hours at 80° C. The copolymer obtained (copolymer A) was in the form of a viscous, water-soluble mass having a K-value of 152.

The viscosity of a 1% aqueous solution of the polymer was 17.8 cst. at 25° C.

Saponification 250 g of the above polymer were dissolved in 700 ml of water to which 37 g of sodium hydroxide solution (50%) were added, enough to saponify the amide groups derived from the monomers acryl amide of the copolymers to carboxylate groups. Saponification occured by heating the mixture to 90° C during 3 hours while stirring. After neutralization with 10N sulfuric acid to a pH value of 7.0, a partially saponified polymer (saponified copolymer A) was obtained that was in the form of a viscous aqueous solution. The viscosity of a 1% aqueous solution of the saponified polymer was 85.4 cst. at 25° C.

In the following Examples, the copolymers according to the invention are compared with known drilling mud additives in different drilling muds at normal temperature and after 15 hours at 200° C. (The percentages are by weight).

A measure for the stability of the drilling sludges prepared with the different additives was their capability of being filtered according to American Petroleum Industry Code 29. The quality of the drilling muds and so the action of the additives was judged upon the "loss in water" in the filter test. In this context, loss in water means the amount of water passing through a standardized filter press in a determined period of time (30 minutes) under a determined adjusted pressure (7kg/cm²). The smaller the amount of water passing through the better the stability of the drilling mud. The tests were carried out at room temperature.

The following additives were used for the tests:
A. Copolymers A (saponified) prepared from 20% vinylsulfonic acid sodium
70% acryl amide
10% N-vinyl-pyrrolidone which were saponified to Example 1.

B. Copolymers (saponified) prepared from

20% of vinylsulfonic sodium
60% acryl amide
20% N-vinyl-N-methylacetamide.

The preparation of the copolymer having a K-value 165 and the saponification of the acryl amide groups were effected according to these process described in Example 1.

C. Copolymer prepared from sodium acrylate and acryl amide according to U.S. Pat. No. 2,775,557, (Example 2, product No. 5) (comparison product).

D. Copolymer prepared from

50% vinylsulfonate and
50% N-vinyl-N-methylacetamide according to German Pat. No. 1 300 481 (comparison product).

E. Carboxymethyl cellulose of medium viscosity (viscosity of a 2% aqueous solution = 100 cp) (comparison product).

F. Iron-chrome lignosulfonate (comparison product).

EXAMPLE 2

To samples having a content of 4% of bentonite in water practically free from electrolytes and having a loss in water occurring without the use of additives according to API of 24 cm³ 0.5% each of the additives A to F to be compared with were added. The losses in water of the samples were measured (a) according to API under normal conditions (20° C) and (b) after a 15 hours' aging at 200° C. The results of these tests are contained in the following Table I.

TABLE I

| Additive | Loss in water according to API in cm³ | |
|---|---|---|
| | a | b (after some time) |
| A | 10.0 | 10.1 |
| B | 9.3 | 9.5 |
| C | 9.8 | 10.0 |
| D | 12.5 | 13.0 |
| E | 9.5 | 29.5 |
| F | 16.2 | 30.0 |

EXAMPLE 3

A drilling mud having a content of 4% of bentonite, 10% of sodium chloride and 0.7% of calcium sulfate had a loss in water of 59 cm³ according to API without the addition of additives. To samples of this mud 2.0% each of the additives A to F were added. The loss in water according to API of these drilling mud samples were measured (a) under normal conditions (20° C) and (b) after a 15 hours' aging at 200° C. The results are shown in the following Table II.

TABLE II

| Additive | Loss in water according to API in cm³ | |
|---|---|---|
| | a | b (after aging) |
| A | 5.2 | 6.5 |
| B | 5.0 | 5.4 |
| C | 5.1 | 27.5 |
| D | 6.8 | 11.5 |
| E | 4.8 | 43.0 |
| F | 25.0 | 58.3 |

The test results show that in muds free from electrolytes, the temperature-resistant additives A to D stand the aging at 200° C without a significant decrease of their properties. At elevated temperatures of about 200° C, saponification of the copolymers in the drilling muds occurs in the absence of lye just the same. Mainly the amide groups derived from the monomer of acryl amide of the copolymers were saponified to carboxylate groups. In additives of the type of acrylate/acryl amide this saponification causes an increased sensibility of the polymers towards calcium and magnesium ions. The compatibility with calcium of the copolymers to be used according to the invention was maintained, however, also in saponified state. The results obtained in Example 3 show that the additive C on the basis of acrylate/acryl amide yields good results under normal conditions, however, that it had become sensible towards calcium ions after a temperature treatment at 200° C due to the further saponification.

A drilling mud has to protect the bore hole wall from decomposition especially in soft clay rocks over a period of time as long as possible, that is to say it must have an inhibitive action on the clay swelling.

In smooth formations, muds having a poor inhibitive effect cause after a relatively short time the caving of rocks, the reaming of the caliber or the break in of the bore hole. To characterize the clay inhibition of the copolymers according to the invention, the additives A to F used in Examples 2 and 3 were tested. For the tests, pressed bodies made of moist formation clay were used which had been dried in the air before the tests. The individual press bodies were submerged in 0.5% aqueous solutions of the additives over a period of time of 5 days. A further press body was submerged in pure water with the consequence of its disintegration after some hours.

The clay press cores showed in the individual inhibition solutions the following behaviour, depending on the respective additives:

| Additive | Inhibition |
|---|---|
| A | excellent, core practically unchanged |
| B | |
| C | medium, parts of the core crumble away |
| D | medium, parts of the core crumble away |
| E | relatively good, core shows a small number of cracks, only a small number of parts crumbling away |
| F | mean, core completely disintegrates after 1 to 2 days. |

The results show that the clay swelling is very well inhibited by the copolymers according to the invention.

For practical use this is an excellent stabilization effect on bore holes in smooth, clay formations.

We claim:

1. An aqueous clay base mud containing per m³ from about 0.5 to 40 kg of a protective colloid, the protective colloid contained in the mud being a copolymer which has a K-value of about 110 to 200 and which is constituted by the components of the formulae I, II and III

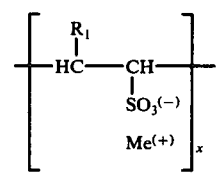

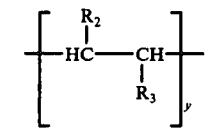

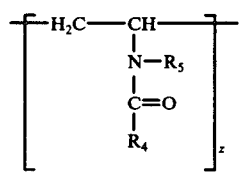

in which $R_1$ and $R_2$ each is hydrogen or $-CH_3$; $R_3$ is $-CO-NH_2$, $-CN$ or $-COOCH_3$; $R_4$ is hydrogen, $-CH_3$ or $-C_2H_5$; $R_5$ is $-CH_3$ or $-C_2H_5$ or $R_4$ and $R_5$ together represent a propylene group forming a pyrrolidone radical with the inclusion of the radical

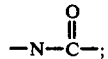

Me is ammonium, potassium, sodium or lithium and $x$ is 5 to 50, $y$ is 40 to 80 and $z$ is 3 to 70, or by the alkaline hydrolysis products thereof and which contains the components in the parts by weight of the starting monomers indicated by the indices $x$, $y$ and $z$.

2. An aqueous clay base mud containing per m³ from about 0.5 to 40 kg of a protective colloid, the protective colloid contained in the mud being a copolymer, which has the K-value of about 110 to 200, of I vinyl or allylsulfonic acid or the potassium, sodium, lithium or ammonium salts thereof, II acrylic or methacrylic acid amide, -nitrile or -methyl ester and, III a N-vinyl-N-alkyl-carboxylic acid amide of the formula

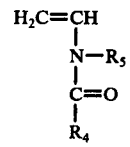

in which $R_4$ is hydrogen, $-CH_3$ or $-C_2H_5$; $R_5$ is $-CH_3$ or $-C_2H_5$ or $R_4$ and $R_5$ together represent a propylene group forming a pyrrolidone radical with the inclusion of the radical

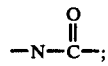

the monomers being present in moieties of 5 - 50% by weight I, 40 - 80% by weight II and 10 - 35% by weight III.

3. The aqueous clay base mud as claimed in claim 5, which contains as protective colloid a copolymer the moieties of monomers of which are 10 - 30% by weight I, 40 - 80% by weight II, and 10 - 35% by weight III.

4. An aqueous clay base mud containing per m³ from about 0.5 to 40 kg of a protective colloid, the protective colloid contained in the mud being the alkaline hydrolysis product of a copolymer, which has a K-value of about 110 to 200, of I vinyl or allylsulfonic acid or the potassium, sodium, lithium or ammonium salts thereof, II acrylic or methacrylic acid amide, -nitrile or -methyl ester and, III a N-vinyl-N-alkyl-carboxylic acid amide of the formula

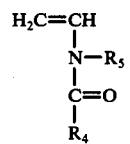

in which $R_4$ is hydrogen, $-CH_3$ or $-C_2H_5$; $R_5$ is $-CH_3$ or $-C_2H_5$ or $R_4$ and $R_5$ taken together represent a propylene group forming a pyrrolidone radical with the inclusion of the radical

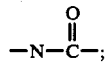

the monomers being present in moieties of 5 - 50% by weight I, 40 - 80% by weight II and 10 - 35% by weight III.

* * * * *